Nov. 21, 1967 G. H. TIDEMALM ET AL 3,353,616
STEERING DEVICE FOR TRACK LAYING VEHICLES
Filed Oct. 20, 1965 3 Sheets-Sheet 1

INVENTORS
GUSTAV HILMER TIDEMALM
NILS OLOV JOHANSSON
BY Hane and Nydick
ATTORNEYS Nov. 21, 1967    G. H. TIDEMALM ET AL    3,353,616
STEERING DEVICE FOR TRACK LAYING VEHICLES
Filed Oct. 20, 1965                              3 Sheets-Sheet 2

INVENTORS
GUSTAV HILMER TIDEMALM
NILS OLOV JOHANSSON
BY
Hane and Nydick
ATTORNEYS INVENTORS
GUSTAV HILMER TIDEMALM
NILS OLOV JOHANSSON
BY
Hane and Nydick
ATTORNEYS

United States Patent Office 3,353,616
Patented Nov. 21, 1967

3,353,616
STEERING DEVICE FOR TRACK LAYING VEHICLES
Gustav Hilmer Tidemalm and Nils Olov Johansson, Karlskoga, Sweden, assignors to Aktiebolaget Bofors, Bofors, Sweden, a Swedish corporation
Filed Oct. 20, 1965, Ser. No. 498,934
Claims priority, application Sweden, Nov. 17, 1964, 13,830/64
6 Claims. (Cl. 180—6.44)

ABSTRACT OF THE DISCLOSURE

A steering device for a track laying vehicle particularly a combat vehicle, the steering device including a hydraulically operated control assembly which permits a restarting of the vehicle and a steering thereof after a temporary disappearance of fluid pressure in the hydraulic assembly as soon as the fluid pressure again becomes available.

---

The present invention relates to a steering device for a track laying vehicle, and in particular, to a steering device in which the steering mechanism includes hydraulically operated steering control means for selectively superimposing auxiliary steering forces to the main driving force applied to the tracks of the vehicle.

The steering device of the invention is particularly advantageous for use with military assault vehicles, such as armored tanks. As it is obvious, assault vehicles are, one one hand, likely to be subjected to damage to components such as the steering assembly, for instance, by enemy action and, on the other hand, it is important that the extent of damage to a vital component such as the steering assembly is limited as much as possible and that, in any event, the vehicle can be readied as quickly as possible to continue its operation even though any repair may be only provisional.

A steering device including hydraulically operated control means for superimposing steering functions upon the the main driving force is more fully described in co-pending application, Ser. No. 452,733, filed May 3, 1965, and assigned to the same assignee as the present application.

In steering systems of the general kind above referred to, a disappearance or even a substantial drop of the hydraulic fluid pressure in the steering control means for any reason makes not only impossible steering of the vehicle by means of the steering control means, but the disappearance of the fluid pressure may also cause substantial damage to components of the steering system as a whole. Moreover, an interruption of the steering control due to a drop of the fluid pressure may make it difficult to re-start the vehicle and steer the same after the crew has succeeded in starting the vehicle.

It is the broad object of the present invention to provide a novel and improved steering system including a hydraulically operated control assembly of the general kind above referred to which permits a re-starting of the vehicle and a steering of the same after a temporary disappearance of adequate fluid pressure in the hydraulic control assembly of the steering device without the danger of encountering the aforepointed out disadvantages of steering devices of this kind as heretofore known.

The aforepointed out object, feature and advantage and other objects, features and advantages which will be pointed out hereinafter are attained by providing in a steering device including a hydraulically controlled control assembly of the general kind above referred to, a safety valve which opens a fluid flow passage between the pressure side and the suction side of the hydraulic system of the control assembly when and while the hydraulic pressure in the hydraulic system is below its normal operational pressure. The safety valve may include a delay means which maintains the flow passage between the pressure side and the suction side of the hydraulic system open for a predetermined period of time after the normal working pressure in the system has been restored.

The steering device according to the invention may also provide the inclusion of one or several brake means in transmission means for transmitting the auxiliary steering force from the control means to the main drive means and thus to the tracks of the vehicle and the control of these brake means by the safety valve so that the brake means lock the transmission means until the normal fluid pressure in the hydraulic system of the steering control means is restored.

The invention will be more fully explained in conjunction with the accompanying drawing which shows a preferred embodiment of the invention by way of illustration and not by way of limitation.

Figure 1:
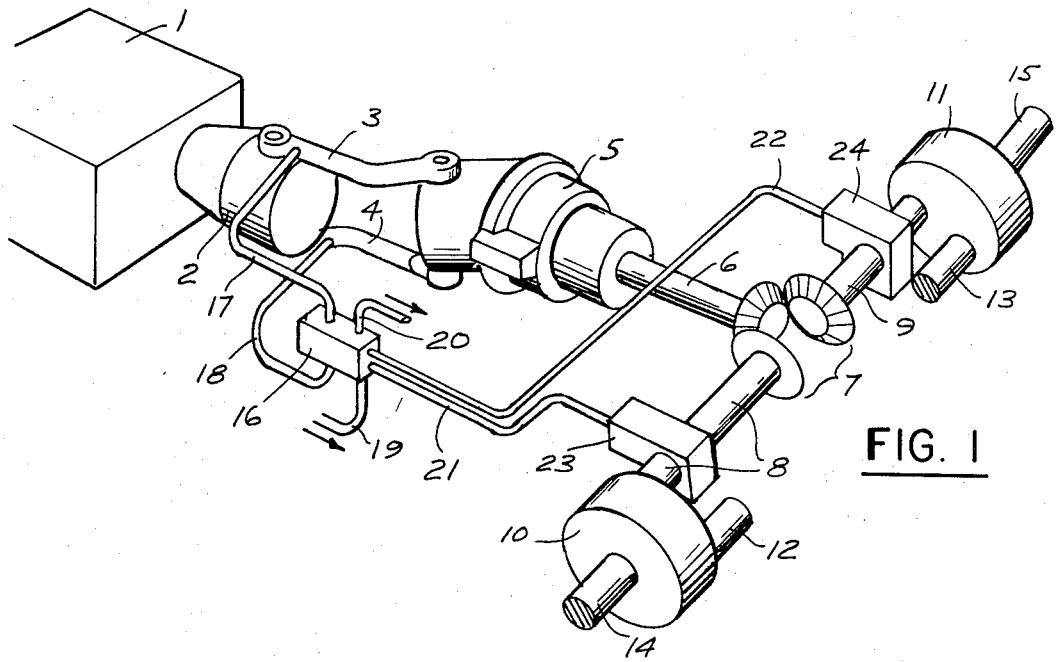
FIG. 1 shows a perspective diagrammatic view of a steering device including a safety valve according to the invention.

Referring first to FIG. 1, this figure shows only those components of the steering device which are essential to the understanding of the present invention to simplify the illustration. The steering device may be visualized as being mounted on the chassis of a track laying vehicle. The chassis itself is not illustrated and also not the main drive means for driving the tracks of the vehicle by a suitable drive motor. In this connection, reference is again made to co-pending application Ser. No. 452,733 which shows, in FIG. 1, the vehicle itself and a driving means for the same.

There is shown in FIG. 1 a suitable drive motor 1 indicated by a box. The motor is directly coupled with a pump part 2 of a hydraulic power system. Pump 2 is coupled by hingedly connected pipes 3 and 4 with a motor part 5 of the hydraulic system. The hydraulic system may be visualized as being of the type disclosed in the afore-referred to prior pending application.

Any control function generated by motor part 5 due to a force fed to the motor part from motor 1 via pump part 2 and pipes 3 and 4 is transmitted via a shaft 6 to a gearing 7. One of the bevel gears of this gearing is connected via a shaft 8 to a gearing 10 and the other via a shaft 9 to a gearing 11. The two gearings may be visualized as conventional planetary gearings. The main driving force for the tracks of the vehicle is transmitted to the gearings via shafts 12 and 13 from the main power plant (not shown) of the vehicle and transmitted via shafts 14 and 15, which constitute the main drive shafts, to the drive wheels for driving the tracks of the vehicle. As it is evident, a rotation of shaft 6 in one or the other direction will superimpose an additive rotational force and a subtractive rotational force, respectively, to the drivng force imparted to shafts 14 and 15 via drive shafts 12, 13 and gearings 10, 11, respectively. Such superimposed rotational forces are utilized to turn the vehicle into one or the other direction by rotating either shaft 14 or shaft 15 at an increased rate of speed and retarding the other shaft correspondingly. Turning control of the vehicle by the forces selectively superimposed upon shafts 14 and 15 is fully described in the above referred to application, Serial No. 432,733.

Pipes 3 and 4 are conected by pipes 17 and 18, respectively, to a safety valve 16 which will be more fully described hereinafter. This valve is connected to a pressure inlet conduit 19 and a suction or pressure outlet conduit 20 which should be visualized as leading to or constituting the pressure side and the suction side, respectively, of a hydraulic pressure fluid supply system (not shown). Valve 16 is further connected by pipes 21 and 22 to brakes 23 and 24, included in shafts 8 and 9, respectively. The two brakes are conventional spring loaded brakes which are held in the braking position by spring pressure unless and until the pressure of the hydraulic fluid, such as oil, in pipes 21 and 22 is above a predetermined value. In other words, the brakes are released as long as the pressure in pipes 21 and 22 is above a predetermined value.

Figure 2:
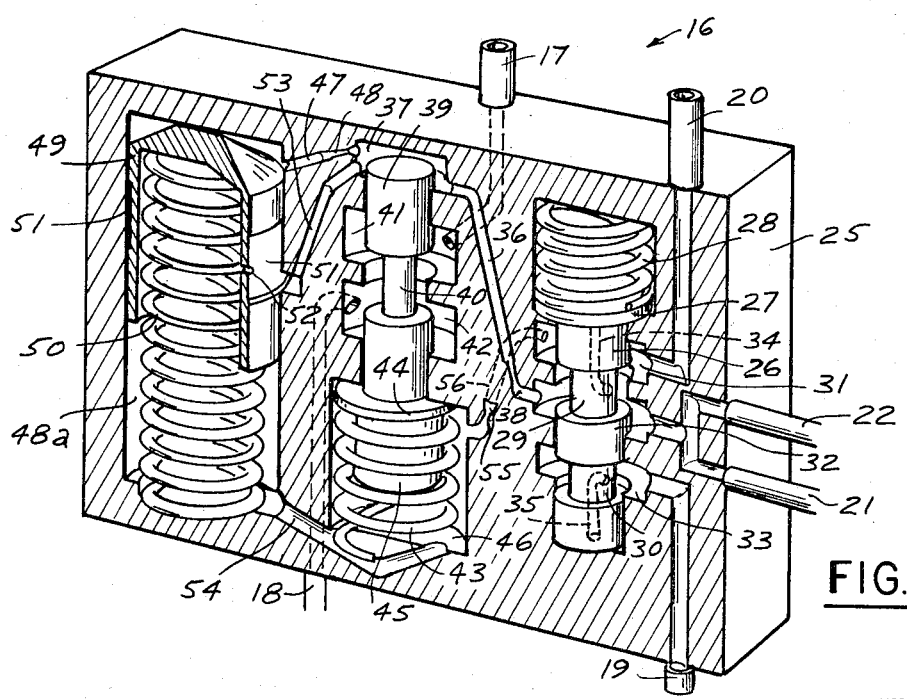
FIG. 2 is a perspective sectional view of the safety valve according to the invention.
Figure 3:
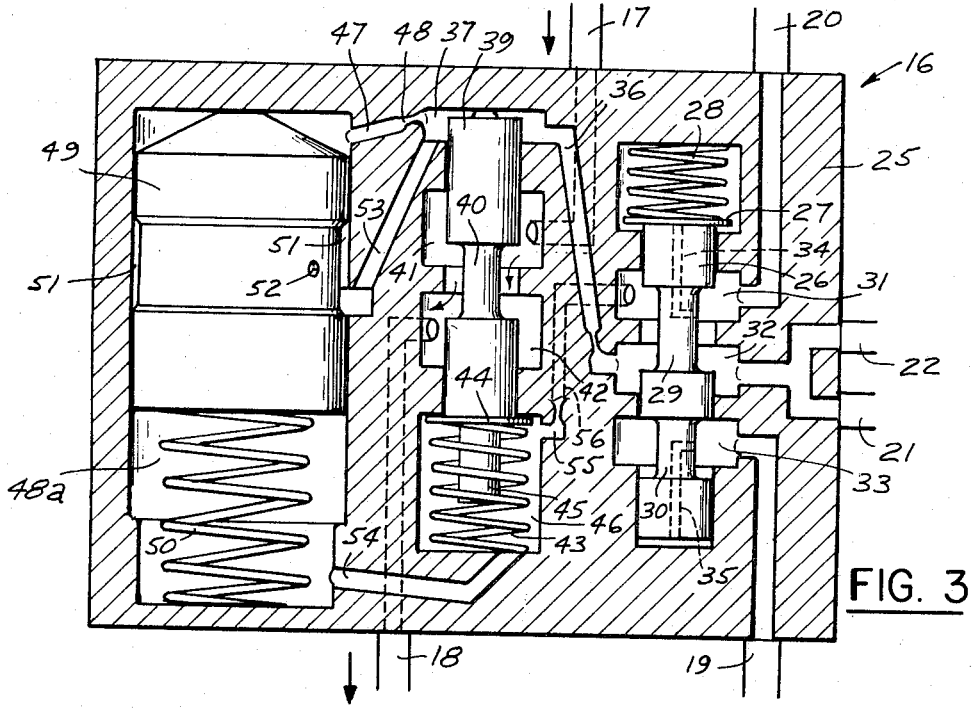
FIGS. 3 through 6 are sectional views of the valve according to FIG. 2 showing the same in different operational positions.

Safety valve 16 will now be described in detail in connection with FIGS. 2 through 6. The valve as exemplified in these figures comprises a valve housing 25 in which a valve member 26 of generally circular cross section is lengthwise slidable. In the absence of oil pressure, the lengthwise position of the valve member is controlled by a loaded coil spring 28 in a housing space 26a, which spring acts via a disc 27 against one end surface of the valve member. The valve member is formed with two circumferential recesses 29 and 30 and the valve housing includes three annular spaces 31, 32 and 33 encompassing the valve member. The dimensions and locations of recesses 29 and 30 in reference to housing spaces 31, 32 and 33 are so selected that, depending upon the lengthwise position of valve member 26, the intermediate housing space 32 is in communication with one of the two outer housing spaces 31 and 33. The valve member further comprises two bores 34 and 35 which lead from the respective recesses 29 and 30 to the respective adjacent plane end faces of the valve member and housing spaces 26a and 26b, respectively. Housing space 33 is connected via conduit 19 with the pressure side of the pressure fluid supply system and housing space 31 is connected via conduit 20 with the outlet side of the supply system. The intermediate housing space 32 is connected to brakes 23 and 24 via pipes 21 and 22. Moreover, housing space 32 is connected via a duct 36, including a throttled or constricted portion 38, to a housing space 37. This housing space is adjacent to a plane end face of a second valve member 39 of generally circular cross section. Valve member 39 is formed with a circumferential recess 40. This recess coacts with annular housing spaces 41 and 42. Housing space 41 is connected to pipe 17 and housing space 42 to pipe 18. The housing space 41 is so correlated with recess 40 of valve member 39 that if and when valve member 39 is not subjected to oil pressure, pipes 17 and 18 are in communication with each other. This position of valve member 39 is shown in FIGS. 2 and 3. The valve member is held in this position by the action of a loaded coil spring 43 which acts upon the valve member via a disc 44. The displacement of valve member 39 against the action of spring 43 is limited by an extension 45. The extension, spring 43 and disc 44 are all disposed within a further space 46 formed in valve housing 25. As it is readily evident and also shown in FIG. 5, extension 45 abuts against the base of space 46 when valve member 39 is moved downwardly by more than a predetermined distance.

Housing space 37 is connected by a duct 47 including a throttled or connected portion 48 to a space 48a in the valve housing. A generally bell or dome shaped hollow member 49 is slidable in this space and is pressed by a loaded coil spring 50 toward its uppermost position, that is, into the part of the space into which duct 47 issues. Bell member 49 has in its outer peripheral wall a circumferential groove 51 communicating through a small aperture 52 with the interior of the bell member. The annular space defined between peripheral wall of space 48a and the base of groove 51 in bell member 49 is connected by a duct 53 with housing space 37. Furthermore, space 48a is connected with housing space 46 by a duct 54. Finally, housing space 46 is connected by a duct 56 including a throttled or constricted portion 55 with housing space 31 which, as previously mentioned, is connected to the suction or outlet side of the hydraulic supply system via pipe 20.

The steering device as hereinbfore described operates as follows:

Let it be assumed that no oil pressure is present in the steering system. Valve 16 then occupies the position shown in FIG. 2 or FIG. 3, that is, spring 43 has moved valve member 39 into the position in which housing spaces 41 and 42 are in connection with each other and thus pipes 17 and 18 are also connected. Valve member 26 is moved by spring 28 into the position in which housing spaces 31 and 32 are in communication with each other. Accordingly, pipes 21 and 22, leading to brakes 23 and 24, respectively, are connected to the outlet pipe 20 of the hydraulic supply system.

The position of the valve shown in FIG. 3 and just described is the position in which the valve should be after the vehicle has stopped and the steering system is inoperative due to a drop of the hydraulic oil pressure below a predetermined level, or even to zero. Under such operational conditions, the pivotal control assembly in pump part 2 of the hydraulic system may be swung out, especially if the vehicle came to a stop at a moment at which a steering function was performed by superimposing a steering force to shafts 14 and 15 as previously described. The pivotal control assembly in the pump part and with it the pumping action in the pump part 2 are restored hydraulically. It may now further be assumed that the driver of the vehicle has released the steering member of the vehicle when the same came to a stop (see aforementioned prior application, Ser. No. 452,733). As a result, a control force will remain in the pump part 2 of the hydraulic assembly. When now the vehicle is re-started, the pump part 2 of the hydraulic system will pump oil through pipes 3 and 4 in a manner such that the motor part 5 of the assembly will turn. Such turning of the motor part is transmitted via shaft 6 and bevel gears 7 to main drive shafts 14 and 15. Accordingly, if the vehicle came to a stop due to a disappearance of the oil pressure and the steering system of the device was not cut off, the starter motor will, in effect, drive the entire vehicle. A starter motor is not normally dimensioned for such a function and unless the starter motor is unusually powerful, it may be damaged when an attempt be made to start the motor under the aforepointed out conditions.

The aforepointed disadvantage is eliminated in a steering system according to the invention by providing the oil flow passage between pipes 3 and 4 via pipes 17 and 18 as controlled by valve 16 (see FIG. 3). As a result, motor part 5 of the hydraulic system is no longer compelled to follow the movement imparted to the pump part 2 by the starter motor of the vehicle. Accordingly, shaft 6 actuated by motor part 5 is no longer controlled by the residual oil in the motor part. However, such an arrangement, while eliminating the aforepointed out undesirable rotation of shaft 6, entails the risk that rotation of main drive shafts 14 and 15 is transmitted via gearings 10 and 11, respectively, shafts 8 and 9, respectively, bevel gears 7 and shaft 6, to motor part 5. As a result of such imparted movement, the motor part may obtain very high r.p.m. resulting in damage thereto. To avoid such an externally imparted high r.p.m. to motor part 5, brakes 23 and 24 are included in shafts 8 and 9, respectively. As it is shown in FIG. 3, pipes 21 and 22 leading to the brakes are not under pressure when the pressure in the hydraulic system has disappeared for any reason. Accordingly, the brakes are engaged and thus block shafts 8 and 9, thereby preventing that a rotational force imparted to the steering device via shaft 14 or shaft 15, that is, externally, can reach motor part 5.

Figure 4:
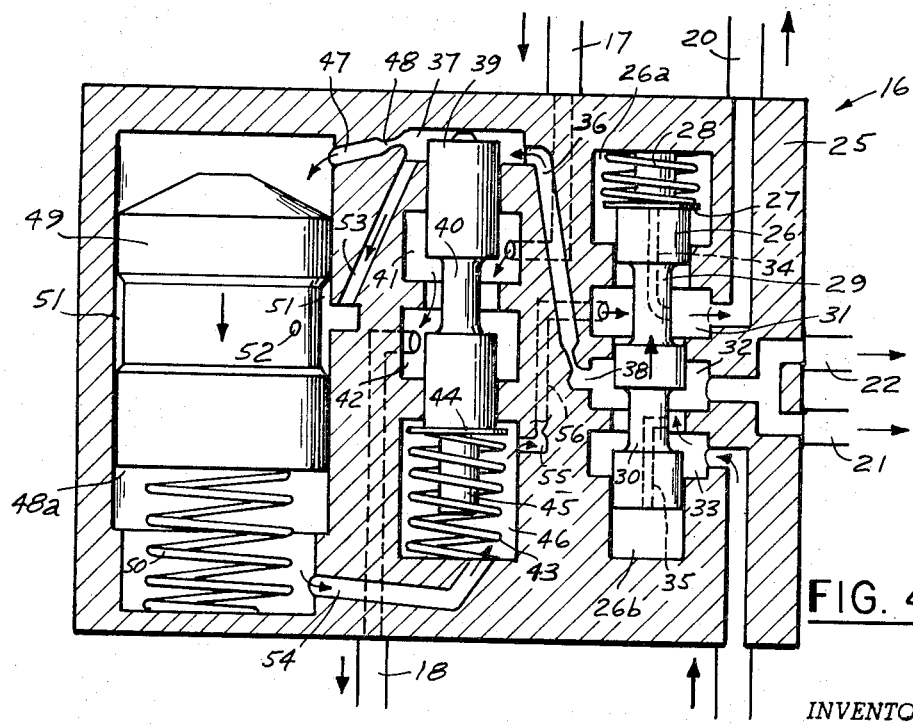

Let it now be assumed that after starting the vehicle the pressure in the hydraulic system is being built-up and it reaches the desired predetermined value. The valve members of valve 16 are then moved into the positions shown in FIG. 4. The oil pressure fed through conduit 19 is now extended through bore 35 into housing space 26b and valve member 26 is upwardly displaced, that is, in opposition to spring 28. As a result, the connection between annular housing spaces 31 and 32 is closed and a connection between housing spaces 32 and 33 is opened as shown in FIG. 4. The oil pressure built-up in housing space 32 is transferred through pipes 21 and 22 to brakes 23 and 24, respectively, thus causing a release thereof. Hence, steering by superimposing steering forces to the main driving force acting upon shafts 14 and 15 is again available.

Figure 5:
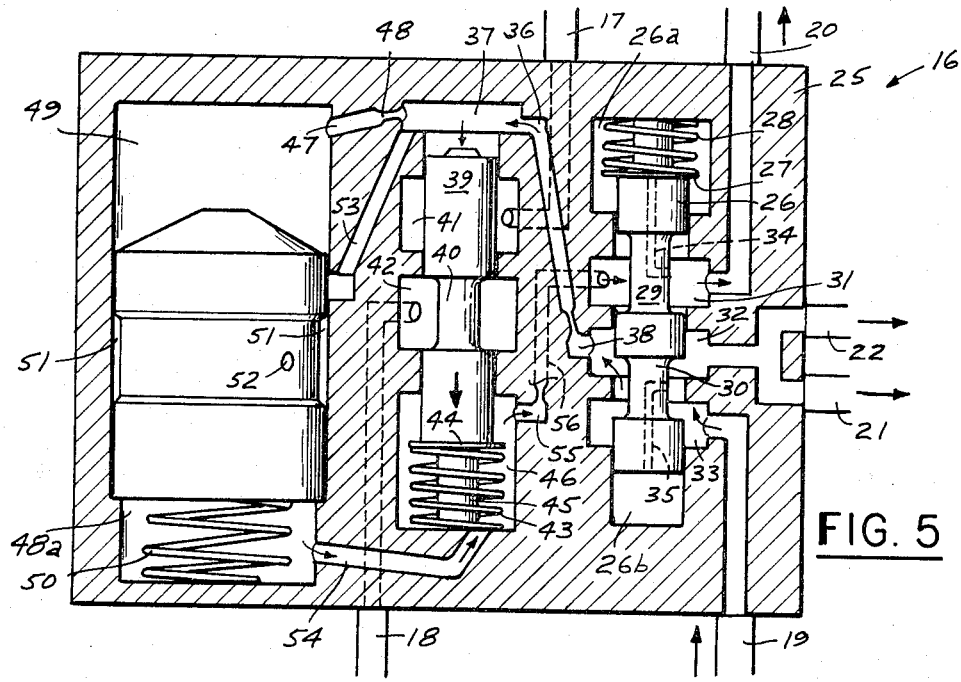

The oil pressure in housing space 32 is also transmitted via the constriction 38 and duct 36 to housing space 37 from which the oil flows partly through the constriction 48 and duct 47 into the part of the housing space 48a which is above bell member 49 and partly through duct 53 into the circumferential recess 51 of the bell member. The oil in recess 51 flows through constricted aperture 52 into the interior 48a of the bell member and from there via duct 54 to housing space 46. The oil thus accumulating in space 46 flows through constriction 55, duct 56, housing space 31 and conduit 20 to the outlet side of the hydraulic system. Due to the oil pressure above the bell member, the latter is depressed downwardly, that is, against the action of spring 50. However, the valve member 39 remains in its position by correlating the constrictions 48, 52 and 55 and spring 43 so that the combined actions of spring 43 and of the oil pressure in housing space 46 are stronger than the pressure of the oil in space 37, tending to move valve member 39 downwardly. Bell member 49 acts thus as a delay device. After a predetermined period of time, such as five seconds, within which the oil has time to flow through the several constrictions in its path, bell member 49 is displaced as it is shown in FIG. 5, thereby closing off duct 53. Housing space 46 is now no longer supplied with oil via duct 54. The oil pressure in space 46 begins to decrease due to the outflow through duct 56, housing space 31 and conduit 20. When the pressure in space 46 has dropped below a predetermined value, the oil pressure in space 37 will overcome the opposing force of spring 43 and depress the valve member into the position shown in FIG. 5. The connection between pipes 17 and 18 is now interrupted. Accordingly, pipes 3 and 4 are no longer connected so that hydraulic system 2 through 5 can now function in a normal manner. In other words, the full steering operation can be carried out a predetermined time after the hydraulic system has reached substantially normal operational pressure. The advantage of providing such delay is that the flow passage between pipes 3 and 4 is not interrupted until the driver can ascertain that the motor of the vehicle has actually started and that the pressure increase in the hydraulic system is not merely due to a temporary pressure increase produced by the starting motor of the vehicle.

Figure 6:
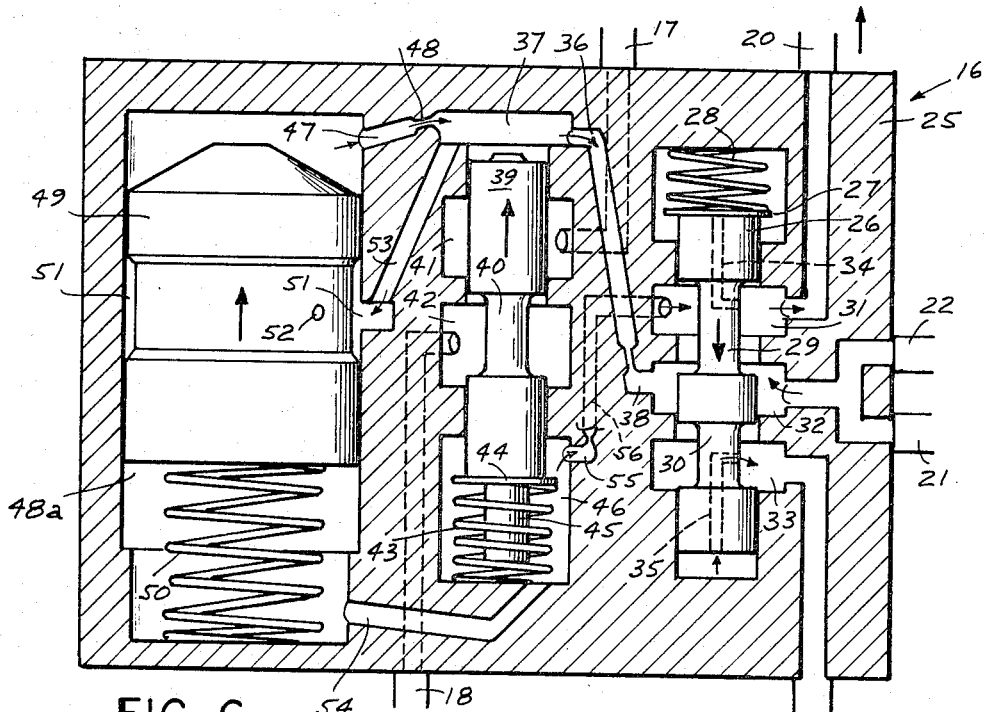

FIG. 6 illustrates the operational conditions which occur when the pressure in the hydraulic system disappears for any reason. Valve member 26 is then displaced downwardly by spring 28, whereby the connection between housing spaces 33 and 32 is interrupted and a connection between housing spaces 31 and 32 is established. Since housing space 31 is directly connected to outlet conduit 20, brake pipes 21 and 22 are also connected to this outlet conduit via housing space 32. Accordingly, the brake pipes drain and the brakes become engaged thereby blocking shafts 8 and 9. At the same time, the pressure in housing space 37 decreases due to the discharge of oil from this space via duct 36, spaces 32 and 31 and conduit 20. Valve member 39 is now returned into the position shown in FIG. 3 by action of spring 43. Similarly, bell member 49 is returned into the position of FIG. 3 by the action of spring 50. As it is evident, the return of valve member 39 is not delayed.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A steering device for a track laying vehicle having power driven driving shafts for driving the vehicle, said device comprising, in combination, hydraulic steering control means for selectively applying steering forces to the driving shafts of said vehicle, said steering control means having a pressure fluid inlet side and a pressure fluid outlet side, and safety valve means responsive to the fluid pressure, said valve means opening a fluid flow passage between said two sides of the steering control means when and while the fluid pressure is below a predetermined value and including a delay means maintaining said fluid flow passage open for a predetermined period of time after the fluid pressure has increased above said predetermined value.

2. A steering device according to claim 1 and comprising transmission means transmitting said steering forces from said hydraulic steering means to said drive shafts, and brake means included in said transmission means and acting upon said drive shafts, said safety valve means activating said brake means for braking action when and while the fluid pressure is below said predetermined value.

3. A steering device for a track laying vehicle having power driven driving shafts for driving the vehicle, said device comprising, in combination, hydraulic steering control means for selectively applying steering forces to the driving shafts of said vehicle, said steering control means having a pressure fluid inlet side and a pressure fluid outlet side, and safety valve means responsive to the fluid pressure to open a fluid flow passage between said two sides of the steering means when and while the fluid pressure is below a predetermined value, said safety valve means including a valve housing, a valve member lengthwise slidable in said housing, the lengthwise position of said valve member controlling the opening and closing of said fluid flow passage, a spring means biasing said valve member into a position opening said flow passage, and conduit means for supplying pressure fluid to said housing, the pressure of the fluid supplied to the housing acting upon said valve member in opposition to said spring means and maintaining the valve member in a position closing the flow passage when the fluid pressure is above said predetermined value, said valve member including two lengthwise spaced circumferential recesses and said valve housing including three annular spaces encompassing said valve member lengthwise spaced in reference thereto, said recesses and said spaces being so correlated that depending upon the lengthwise position of said valve member the intermediate one of said spaces is in communication with either one of said outer spaces, said valve member further including ducts connecting one of the outer spaces to a first further space in the housing adjacent to one end face of the valve member and the other outer space to a second further space in the housing adjacent to the other end face of the valve member, said first further space including said spring means, a second valve member lengthwise slidable in said housing, said housing including a third further space adjacent to one end face of the second valve member and a fourth further space adjacent to the other end face of the second valve member, a second spring means in said fourth further space urging said second valve member toward the third further space, said housing including a throttled duct connecting said third further space to the intermediate space surrounding the first valve member for feeding fluid pressure into said third further space from said pressure inlet via one outer housing space and the intermediate outer space, a fluid pressure below a predetermined value in said third further housing space causing opening of said flow passage between the pressure side and the outlet side of the hydraulic steering means and a fluid pressure above said predetermined value causing a closing of said flow passage.

4. A device according to claim 3, wherein said valve housing includes a second throttled duct connecting said fourth further housing space to said one outer housing space surrounding the first valve member, said second spring means and said second throttled duct being so correlated that the second valve member is displaced against the action of the second spring means when a connection between said fourth further housing space and said one outer housing space is interrupted.

5. A steering device according to claim 4 and comprising a hollow bell shaped member lengthwise slidable in another housing space, the lengthwise position of said bell member controlling the connection between said fourth further housing space and said one outer housing space, a third spring means biasing said bell member toward the end of said other housing space adjacent to the closed bell member end, said end of said other housing space being connected to said third further housing space, said third further housing space being further connected to the interior of the bell member via an aperture in a side wall thereof, the interior of the bell member being also connected to said fourth further housing space, said bell member interrupting the connection between the third further housing space and the fourth further housing space in response to being displaced in its housing space due to a fluid pressure drop below a predetermined value.

6. A steering device according to claim 3 and comprising two normally engaged and hydraulically operated brake means, one for each direction of turning of the vehicle, included in said hydraulic steering means, and wherein the intermediate one of said housing spaces surrounding said first valve member is connected to each of said brake means for feeding pressure fluid to the same, said brake means being in engaged positions when and while the fluid pressure in said connection leading to the brake means is below a predetermined value and being released in response to a pressure of the fluid fed thereto above said predetermined value.

References Cited

UNITED STATES PATENTS

| | | | |
|---|---|---|---|
| 1,797,797 | 3/1931 | Saives | 74—720.5 X |
| 2,004,929 | 6/1935 | Centervall | 180—6.44 X |
| 2,336,912 | 12/1943 | Zimmermann | 180—6.44 X |
| 2,518,578 | 8/1950 | Tomlinson. | |

BENJAMIN HERSH, *Primary Examiner.*

J. A. PEKAR, *Assistant Examiner.*